(12) United States Patent
Choi et al.

(10) Patent No.: US 10,448,322 B2
(45) Date of Patent: Oct. 15, 2019

(54) METHOD AND APPARATUS FOR CONTROLLING POWER CONSUMPTION IN MOBILE COMMUNICATION SYSTEM

(71) Applicant: Samsung Electronics Co., Ltd., Suwon-si (KR)

(72) Inventors: Yonghae Choi, Seongnam-si (KR); Changyup Lee, Seoul (KR); Song Hun Kim, Suwon-si (KR); Hanseok Kim, Seoul (KR); Seongyong Park, Seongnam-si (KR); Jeongjae Won, Hwaseong-si (KR); Bumjun Kim, Yongin-si (KR); Heesang Seo, Seoul (KR); Donggeun Lee, Hwaseong-si (KR); Junsung Lee, Guri-si (KR); Sub Hur, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 114 days.

(21) Appl. No.: 14/990,329

(22) Filed: Jan. 7, 2016

(65) Prior Publication Data
US 2016/0198405 A1 Jul. 7, 2016

(30) Foreign Application Priority Data
Jan. 7, 2015 (KR) .................. 10-2015-0001852

(51) Int. Cl.
*H04W 52/02* (2009.01)

(52) U.S. Cl.
CPC ..... *H04W 52/0206* (2013.01); *Y02D 70/1242* (2018.01); *Y02D 70/1262* (2018.01); *Y02D 70/23* (2018.01)

(58) Field of Classification Search
CPC ... H04W 52/0206; Y02B 60/50; Y02D 70/23; Y02D 70/1242; Y02D 70/1262
See application file for complete search history.

(56) References Cited

U.S. PATENT DOCUMENTS

| 2010/0262895 A1 | 10/2010 | Dale et al. |
| 2012/0044845 A1 | 2/2012 | Lee et al. |

(Continued)

FOREIGN PATENT DOCUMENTS

| EP | 2404468 A1 | 1/2012 |
| EP | 2487964 A1 | 8/2012 |

(Continued)

OTHER PUBLICATIONS

International Search Report dated Apr. 25, 2016 corresponding to International Patent Application No. PCT/KR2016/000094.

(Continued)

*Primary Examiner* — Jackie Zuniga Abad
(74) *Attorney, Agent, or Firm* — The Farrell Law Firm, P.C.

(57) ABSTRACT

An embodiment of the present disclosure may provide a power consumption controlling method and apparatus. An embodiment of the present disclosure may provide a method and apparatus for controlling power consumption by a base station, the method comprising: determining empty symbol duration in at least one subframe; and performing a power amplifier (PA) on/off operation based on the determination result. Further, an embodiment of the present disclosure may provide a method and apparatus for controlling power consumption by a base station, the method comprising: generating baseband in-phase/quadrature-phase (IQ) data; determining whether the baseband IQ data includes data which must be transmitted for a predetermined time; and controlling a PA on/off based on the determination result and a transient of a power amplifier (PA).

18 Claims, 11 Drawing Sheets

(56) References Cited

U.S. PATENT DOCUMENTS

2012/0122472 A1* 5/2012 Krishnamurthy ..... H04L 5/0053
455/456.1
2014/0105101 A1 4/2014 Vu et al.

FOREIGN PATENT DOCUMENTS

EP          2547154 A1    1/2013
KR     2012-0018266 A     3/2012
WO      2013-182507 A1   12/2013

OTHER PUBLICATIONS

Extended European Search Report Appln. No. 16735162.6 dated Jan. 2, 2018 (7 pgs).

* cited by examiner

- CRS Symbol Pattern Mask

| | slot#0 | | | | | | | slot#1 | | | | | | |
|---|---|---|---|---|---|---|---|---|---|---|---|---|---|---|
| port 0 | *0* | 1 | 2 | 3 | *4* | 5 | 6 | *0* | 1 | 2 | 3 | *4* | 5 | 6 |

| | slot#0 | | | | | | | slot#1 | | | | | | |
|---|---|---|---|---|---|---|---|---|---|---|---|---|---|---|
| port 1 | *0* | 1 | 2 | 3 | *4* | 5 | 6 | *0* | 1 | 2 | 3 | *4* | 5 | 6 |

| | slot#0 | | | | | | | slot#1 | | | | | | |
|---|---|---|---|---|---|---|---|---|---|---|---|---|---|---|
| port 2 | 0 | *1* | 2 | 3 | 4 | 5 | 6 | 0 | *1* | 2 | 3 | 4 | 5 | 6 |

| | slot#0 | | | | | | | slot#1 | | | | | | |
|---|---|---|---|---|---|---|---|---|---|---|---|---|---|---|
| port 3 | 0 | *1* | 2 | 3 | 4 | 5 | 6 | 0 | *1* | 2 | 3 | 4 | 5 | 6 |

- Control Symbol Pattern Mask (Available for CFI #1-3, available for CFI #2-4)

| | slot#0 | | | | | | | slot#1 | | | | | | |
|---|---|---|---|---|---|---|---|---|---|---|---|---|---|---|
| CFI=1 | *0* | 1 | 2 | 3 | 4 | 5 | 6 | 0 | 1 | 2 | 3 | 4 | 5 | 6 |

| | slot#0 | | | | | | | slot#1 | | | | | | |
|---|---|---|---|---|---|---|---|---|---|---|---|---|---|---|
| CFI=2 | *0* | *1* | 2 | 3 | 4 | 5 | 6 | 0 | 1 | 2 | 3 | 4 | 5 | 6 |

| | slot#0 | | | | | | | slot#1 | | | | | | |
|---|---|---|---|---|---|---|---|---|---|---|---|---|---|---|
| CFI=3 | *0* | *1* | *2* | 3 | 4 | 5 | 6 | 0 | 1 | 2 | 3 | 4 | 5 | 6 |

| | slot#0 | | | | | | | slot#1 | | | | | | |
|---|---|---|---|---|---|---|---|---|---|---|---|---|---|---|
| CFI=4 | *0* | *1* | *2* | *3* | 4 | 5 | 6 | 0 | 1 | 2 | 3 | 4 | 5 | 6 |
| [Available only in BW=1.4 MHz] | | | | | | | | | | | | | | |

FIG. 3A

- PSS Symbol Pattern Mask (Transmission in subframes 0 and 5 in FDD, and in subframes 1 and 6 in TDD)

|  | slot#0 |  |  |  |  |  |  | slot#1 |  |  |  |  |  |  |
|---|---|---|---|---|---|---|---|---|---|---|---|---|---|---|
| FDD | 0 | 1 | 2 | 3 | 4 | 5 | *6* | 0 | 1 | 2 | 3 | 4 | 5 | 6 |

|  | slot#0 |  |  |  |  |  |  | slot#1 |  |  |  |  |  |  |
|---|---|---|---|---|---|---|---|---|---|---|---|---|---|---|
| TDD | 0 | 1 | *2* | 3 | 4 | 5 | 6 | 0 | 1 | 2 | 3 | 4 | 5 | 6 |

- SSS Symbol Pattern Mask (Transmission in subframes 0 and 5 in both FDD and TDD)

|  | slot#0 |  |  |  |  |  |  | slot#1 |  |  |  |  |  |  |
|---|---|---|---|---|---|---|---|---|---|---|---|---|---|---|
| FDD | 0 | 1 | 2 | 3 | 4 | *5* | 6 | 0 | 1 | 2 | 3 | 4 | 5 | 6 |

|  | slot#0 |  |  |  |  |  |  | slot#1 |  |  |  |  |  |  |
|---|---|---|---|---|---|---|---|---|---|---|---|---|---|---|
| TDD | 0 | 1 | 2 | 3 | 4 | 5 | 6 | 0 | 1 | 2 | 3 | 4 | 5 | *6* |

- PBCH Symbol Pattern Mask (Transmission in subframe 0)

|  | slot#0 |  |  |  |  |  |  | slot#1 |  |  |  |  |  |  |
|---|---|---|---|---|---|---|---|---|---|---|---|---|---|---|
|  | 0 | 1 | 2 | 3 | 4 | 5 | 6 | *0* | *1* | *2* | *3* | 4 | 5 | 6 |

- PRS Symbol Pattern Mask (Allocated according to PRS period and offset)

|  | slot#0 |  |  |  |  |  |  | slot#1 |  |  |  |  |  |  |
|---|---|---|---|---|---|---|---|---|---|---|---|---|---|---|
| 1,2 | 0 | 1 | 2 | *3* | 4 | *5* | *6* | 0 | *1* | *2* | *3* | 4 | *5* | *6* |

|  | slot#0 |  |  |  |  |  |  | slot#1 |  |  |  |  |  |  |
|---|---|---|---|---|---|---|---|---|---|---|---|---|---|---|
| 4 | 0 | 1 | 2 | *3* | 4 | *5* | *6* | 0 | 1 | *2* | *3* | 4 | *5* | *6* |

FIG. 3B

- Ant0/1

Occupied Symbol (black) & Unused Symbol (white)

| slot#0 | | | | | | | slot#1 | | | | | | |
|---|---|---|---|---|---|---|---|---|---|---|---|---|---|
| 0 | 1 | 2 | 3 | 4 | 5 | 6 | 0 | 1 | 2 | 3 | 4 | 5 | 6 |

- Ant2/3

Occupied Symbol (black) & Unused Symbol (white)

| slot#0 | | | | | | | slot#1 | | | | | | |
|---|---|---|---|---|---|---|---|---|---|---|---|---|---|
| 0 | 1 | 2 | 3 | 4 | 5 | 6 | 0 | 1 | 2 | 3 | 4 | 5 | 6 |

FIG. 4

METHOD AND APPARATUS FOR CONTROLLING POWER CONSUMPTION IN MOBILE COMMUNICATION SYSTEM

RELATED APPLICATION(S)

This application claims priority from and the benefit under 35 U.S.C. § 119(a) of Korean Patent Application No. 10-2015-0001852, filed on Jan. 7, 2015, which is hereby incorporated by reference for all purposes as if fully set forth herein.

BACKGROUND

The present disclosure relates to a method and apparatus for controlling power consumption in a mobile communication system. Particularly, the present disclosure relates to a method and apparatus for controlling a power amplifier (PA), using signal properties and a traffic situation in a mobile communication system.

Two methods are used to reduce power consumption in a wireless signal processing unit, radio frequency unit, or RU. The first method is to reduce power consumption by increasing the efficiency of a PA in the view of maximum power, and the second method is to reduce RU power consumption by adjusting a PA bias according to a traffic situation in the field.

Since the first method is designed in the view of maximum power, the efficiency of the PA is reduced when traffic in the field is low. Hence, the first scheme is not reasonable in reducing power consumption.

The second method may be divided into two schemes. One is a PA bias on/off scheme based on a real-time downlink schedule result in a time division duplexer (TDD) Orthogonal Frequency-Division Multiple Access (OFDMA)-based wireless system. The other is a scheme in which a digital signal processing unit, digital unit, or DU receives traffic load information and increases the efficiency of a PA by adjusting a PA gate drain bias according to the received information.

In a time division duplexer (TDD) system, one frame includes a downlink (DL) subframe and an uplink (UL) subframe. A base station transmits a radio wave in the DL subframe and receives a terminal signal in the UL subframe. In an orthogonal frequency division multiple access (OFDMA)-based DL subframe resource area, a scheduling algorithm allocates resources to symbols in a way to enable maximum use of the frequency area from the first orthogonal frequency division multiplexing (OFDM) symbol. As a result, an OFDM symbol duration, to which a DL burst is not allocated, may exist. In the OFDM symbol duration, to which the burst is not allocated, power consumption may be reduced by turning off a PA bias. At this time, an operation of controlling a bias by transferring a scheduling result to an RU for each frame may be performed. However, a frequency division duplexer (FDD) system includes a control channel which cannot be controlled by the scheduling algorithm, and thus it is difficult to generate an Orthogonal Frequency Division Multiplexing (OFDM) symbol duration to which a DL burst is not allocated in FDD system.

A PA bias control method may adjust an RU PA bias voltage level during a time at which physical resource block (PRB) usage is low, thereby reducing power consumption. To this end, the method may perform a scheduling based on the limited number of resource blocks (RBs) to minimize an influence on an RU amp and coverage. In the current implemented PA bias control method, traffic monitoring is performed based on statistics. Therefore, when user traffic suddenly increases, peak throughput may be not satisfied.

SUMMARY

The present disclosure provides an improved method and apparatus for controlling power consumption in a mobile communication system. Further, the present disclosure provides a method and apparatus for controlling a PA, using signal properties and a traffic situation in a mobile communication system.

According to an embodiment of the present disclosure, a power consumption control method by a base station may be provided, the method comprising: determining a duration of an empty symbol in at least one subframe, thereby yielding a determination result; and performing a power amplfier (PA) on/off operation based on the determination result.

Further, according to an embodiment of the present disclosure, a base station for controlling power consumption may be provided, the base station comprising: a PA that amplifies a wireless signal; and a controller that determines a duration of an empty symbol in at least one subframe yielding a determination result and controls a PA on/off operation based on the determination result.

Further, according to an embodiment of the present disclosure, a method for controlling power consumption by a base station may be provided, the method comprising: generating baseband in-phase/quadrature-phase (IQ) data; determining whether the baseband IQ data includes data which is to be transmitted for a predetermined time, thereby yielding a determination result; and controlling a PA on/off based on the determination result and a transient time of a PA.

Further, according to an embodiment of the present disclosure, a base station for controlling power consumption may be provided, the base station comprising: a PA that amplifies a wireless signal; and a controller that generates baseband IQ data, determines whether the baseband IQ data includes data which is to be transmitted for a predetermined time yielding a determination result, and performs a control such that a PA on/off is perfomed based on the determination result and a transient time of the PA.

The technical subjects pursued in the present disclosure may not be limited to the above mentioned technical subjects, and other technical subjects which are not mentioned may be clearly understood, through the following descriptions, by those skilled in the art of the present disclosure.

An embodiment of the present disclosure can provide an improved method and apparatus for controlling power consumption in a mobile communication system. Further, an embodiment of the present disclosure can provide a method and apparatus for controlling a PA, using signal properties and a traffic situation in a mobile communication system.

Further, according to an embodiment of the present disclosure, an empty symbol duration, to which a user traffic and a control channel are not allocated, may be transferred from a DU to an RU or monitored and determined by the RU, and may be used to control PA on/off in real time.

An embodiment of the present disclosure can be applied to both TDD and FDD systems can more greatly reduce power consumption than lowering a PA bias voltage by turning off a PA, and can operates while reflecting an actual traffic change in real time.

BRIEF DESCRIPTION OF THE DRAWINGS

The above and other objects, features and advantages of the present disclosure will be more apparent from the following detailed description in conjunction with the accompanying drawings, in which:

FIG. 3A, FIG. 3B, and FIG. 4 describe a method for expressing unused symbol information for each subframe;

DETAILED DESCRIPTION

Figure 1:
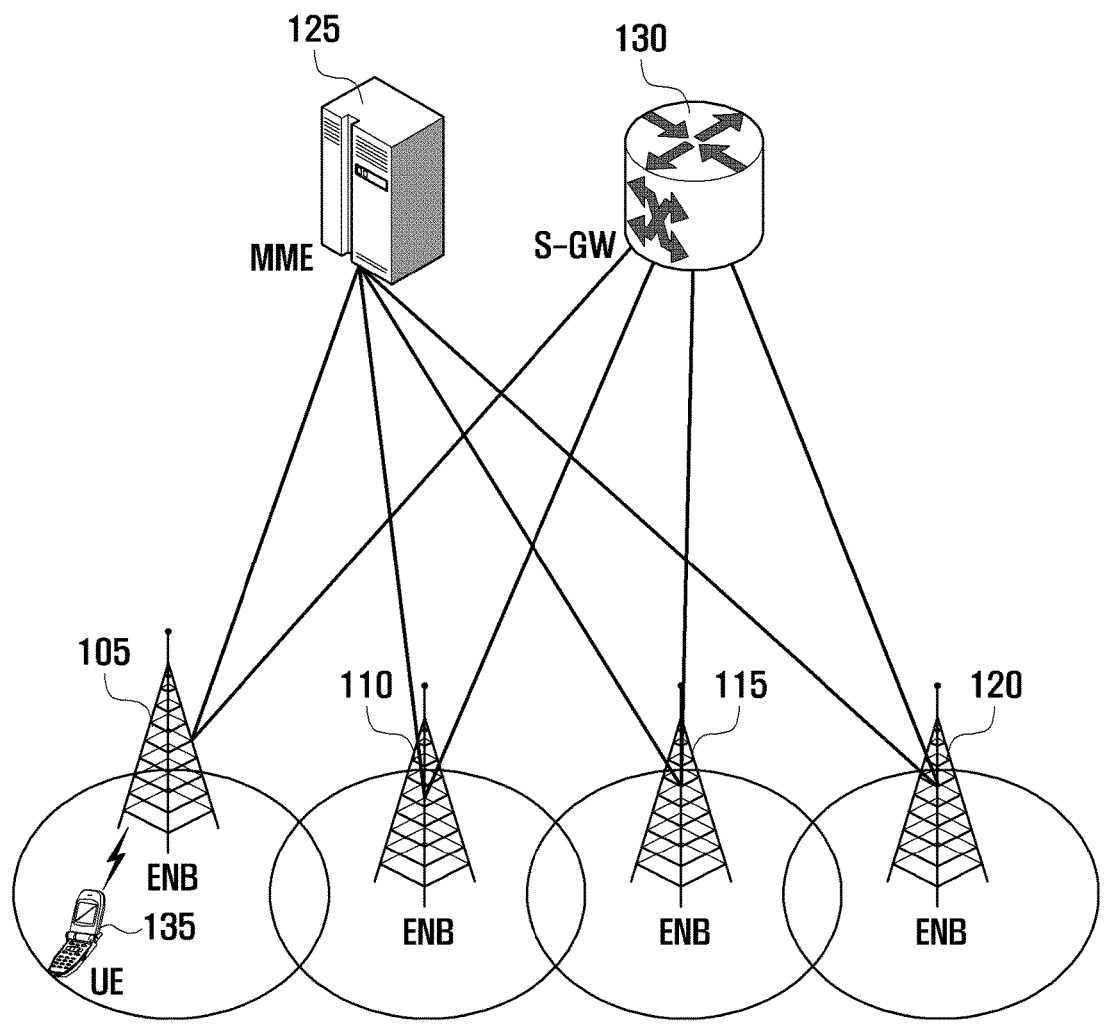
FIG. 1 illustrates the structure of a Long Term Evolution (LTE) system to which the present disclosure is applied.

Hereinafter, various embodiments will be described with reference to the accompanying drawings. It should be noted that the same elements will be designated by the same reference numerals although they are shown in different drawings. Further, a detailed description of a known function and configuration which may make the subject matter of the present disclosure unclear will be omitted. Hereinafter, it should be noted that only the descriptions will be provided that may help understanding the operations provided in association with the various embodiments of the present disclosure, and other descriptions will be omitted to avoid making the subject matter of the present disclosure rather unclear.

The present disclosure relates to a method and apparatus for controlling power consumption in a mobile communication system. Particularly, the present disclosure relates to a method and apparatus for controlling a power amplifier (PA), using signal properties and a traffic situation in a mobile communication system. An embodiment of the present disclosure may provide a method and apparatus for reducing power consumption by a wireless signal processing unit, radio frequency unit, or RU via performing PA off with regard to an unused symbol duration at a time at which PRB usage in an operation network is low. When the PA off is performed in a particular symbol in an embodiment of the present disclosure, the particular symbol may correspond to a transmission time point at which the particular symbol is transmitted from an RU or from a base station antenna.

An embodiment of the present disclosure may provide a method and apparatus for performing PA off in consideration of transmitting a control channel by a power consumption reducing method which can be applied to both TDD and FDD systems. For example, the embodiment may provide a method and apparatus for recognizing, by an RU, an unused symbol duration, in which the PA off may be performed, in consideration of a case in which a control channel, such as a cell-specific reference signal (CRS), a physical broadcast channel (PBCH), or a synchronization signal, must be transmitted even without there is no user traffic.

The present disclosure is applied to a mobile communication system, and, particularly, to an evolved universal mobile telecommunication system (E-UMTS) evolved from a universal mobile telecommunication system (UMTS). However, the present disclosure is not limited thereto, and may be applied to all communication systems and communication protocols, to which a technical idea of the present disclosure may be applied. Hereinafter, an embodiment of the present disclosure will be described using LTE system.

FIG. 1 illustrates the structure of an LTE system to which the present disclosure is applied.

Referring to FIG. 1, a wireless access network of an LTE system includes: a next-generation base stations, base station, Evolved Node Bs, Node Bs, or eNBs 105, 110, 115, and 120; a Mobility Management Entity (MME) 125; and a Serving-Gateway (S-GW) 130. A terminal, User Equipment, or UE 135 accesses an external network through the eNBs (105-120) and the S-GW 130.

The eNBs 105-120 in FIG. 1 correspond to the conventional eNBs of a UMTS. The eNB is connected with the UE 135 through a wireless channel, and performs a more complicated role than the conventional node B. In a Long Term Evolution (LTE) system, all user traffics including a real-time service such as a Voice over Internet Protocol (VoIP) through an Internet protocol are, provided through a shared channel. Therefore, the LTE system requires an apparatus which gathers and schedules state information, such as the buffer state of UEs, the available transmission power state thereof, and the channel state thereof; and the eNBs 105-120 serve as such an apparatus. One eNB generally controls multiple cells. For example, in order to implement a transmission rate of 100 Mbps, the LTE system uses an Orthogonal Frequency Division Multiplexing (OFDM) as a wireless access technology in a bandwidth of 20 MHz. Also, a modulation scheme and an Adaptive Modulation and Coding (AMC) scheme, which determines the channel coding rate, are applied according to the channel state of a terminal.

The S-GW 130 is an apparatus for providing a data bearer, and generates or removes the data bearer under a control of the MME 125. The MME 125 is an apparatus for performing various control functions as well as a mobility management function with respect to the terminal, and is connected to multiple base stations.

Recently, a base station in LTE system is implemented to have a digital signal processing unit, or digital unit (DU), and a wireless signal processing unit, or radio frequency unit (RU), which are separated from each other. The RU mainly transmits/receives a radio wave and the DU mainly transmits/receives data. The data processed by the DU may be transmitted by a radio wave through the RU, and the radio wave received by RU may be processed by the DU and used as data. The DU and the RU may be connected to each other through an optical communication technology.

Observation of the PRB usage of an eNB, with regard to each cell, on the actual field in an LTE system network reveals that cases in which user traffic is not actually allocated occupy at least 80% on average, on a daily basis, and even rise to 90% in the idlest case. However, in the LTE system, even when user traffic for one transmission time interval (TTI), a PA off state cannot be maintained due to a periodically occurring control signal. The TTI includes, for example, a subframe, and the subframe in the LTE system may be 1 ms interval. In embodiments of the present disclosure, the TTI and the subframe may be used as concepts similar to each other.

In order to solve the above-described problem, embodiments of the present disclosure provide embodiments for performing a dynamic PA on/off operation. The first embodiment is to adjust a PA gate bias with regard to unused symbol duration by transferring, from the DU to the RU, unused symbol duration information during scheduling. In the second embodiment, the RU adjusts a gate PA bias by tracking a baseband signal for Tx transmission from the DU. A baseband IQ data signal may be used. An IQ modulation is a technique that combines information from two channels into a combined signal, and separates the combined information from each other in a subsequent stage. Two quadrature carriers having a 90 degree phase difference are modulated and then combined with each other. An IQ is an acronym for an in-phase/quadrature-phase and refers to a phase relationship between two carrier signals.

Figure 2:
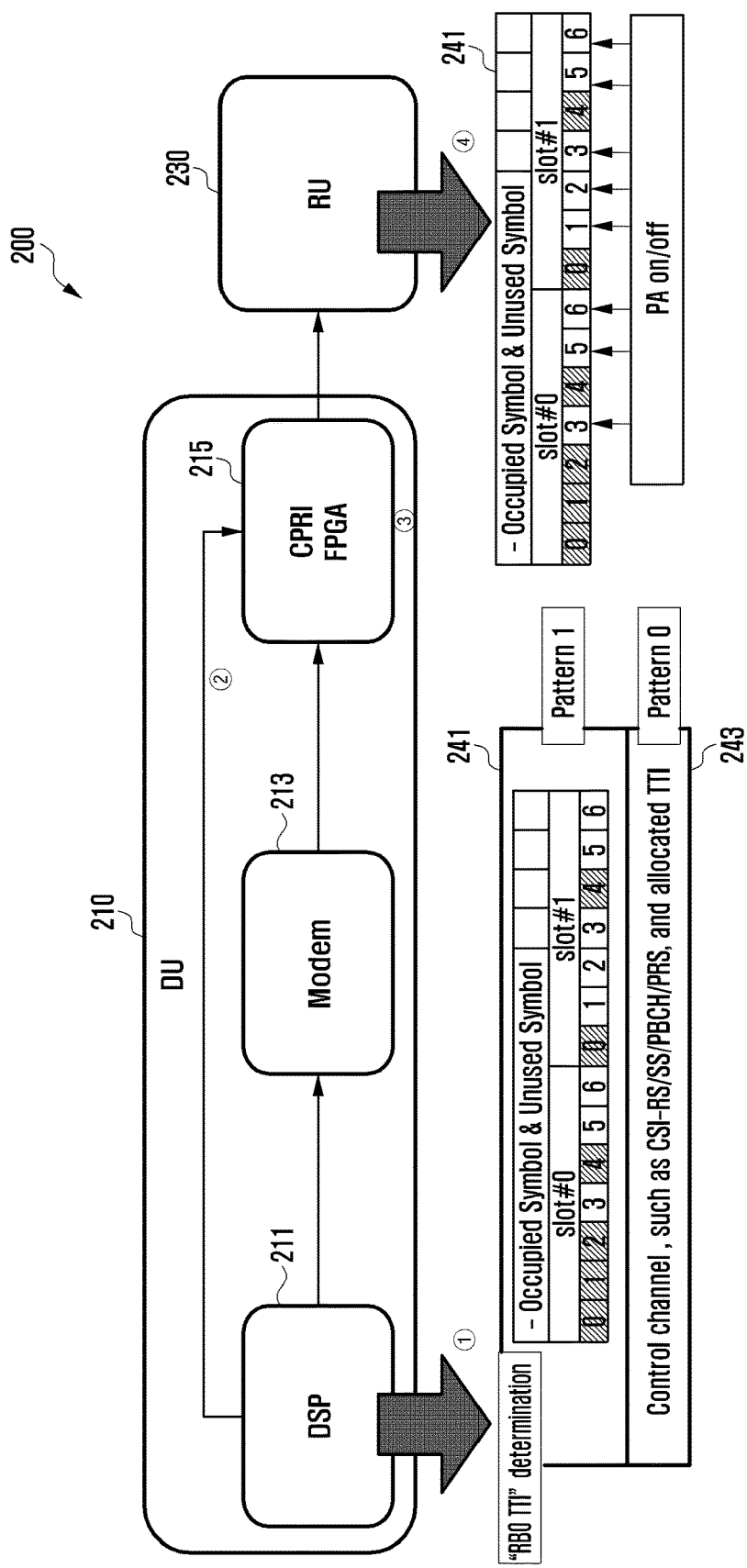
FIG. 2 illustrates a base station according to an embodiment of the present disclosure.

FIG. 2 describes a base station according to an embodiment of the present disclosure.

Referring to FIG. 2, a base station 200 may include a DU and an RU. An RU 230 mainly transmits/receives a radio wave and a DU 210 mainly transmits/receives data. The data processed by the DU 210 may be transmitted by a radio wave through the RU 230 and the radio wave received by RU 230 may be processed by the DU 210 and used as the data. The DU 210 and the RU 230 may be wiredly connected to each other, and may be connected to each other, for example, through an optical communication technology.

The DU 210 may include a digital signal processor (DSP) 211, a modem 213, and a Common Public Radio Interface (CPRI) Field Programmable Gate Array (FPGA), or CPRI FPGA 215. Further, although not illustrated, the DU 210 may further include operations, administration, and maintenance (OAM) for the operation, maintenance, and repair of the DU. Further the DU 210 may further include a scheduler. The DU 210 may be referred to as a scheduler of a base station. Each entity included in the DU 210 may include at least one module and may also include, for example, one controller.

The DSP 211 is an integrated circuit which enables a machine apparatus to quickly process a digital signal. In embodiments of the present disclosure, the DSP 211 may determine information in units of TTI according to allocation information of a control channel and RB. The information may be an indicator (an indication, a pattern). For example, the DSP 211 may determine the duration of an empty symbol in units of TTI and determine Pattern 1 or Pattern 0. In the case of 4 bits, the DSP 211 may determine information such as 0001 and 0000. Further, the DSP 211 may transfer the determined pattern information to the CPRI FPGA 215.

The CPRI FPGA 215 serves as an interface for communication between the DU and the RU in a structure in which the DU and the RU are separated from each other. The CPRI FPGA 215 may transfer information received from the DSP 211 to the RU 230. For example, the CPRI FPGA 215 may transfer TTI unit pattern information to the RU 230 through a Common Public Radio Interface Vendor-Specific Space (CPRI VS S).

The RU 230 may perform PA on/off based on information received from the DU. The information may correspond to pattern information. The pattern information may indicate 0 or 1. For example, when the pattern information indicates 1, the RU 230 may perform PA on/off with regard to a predetermined symbol for each antenna port. When the pattern information indicates 0, the RU 230 may not perform PA on/off. Meanwhile, when the pattern information corresponds to 0 or 1, an operation may be performed in reverse according to the configuration. For example, when the pattern information corresponds to 1, the RU 230 is configured not to perform PA on/off operation.

Meanwhile, in the above description, the DU 210 and the RU 230 are distinguished from each other and the DU 210 includes the DSP 211, the modem 231, and the CPRI FPGA 215. However, the present disclosure does not limit the configuration of the base station 200 thereto. For example, the base station 200 may also include a controller that controls overall operations of the base station and a communication unit that transmits/receives a signal to/from another network node. At this time, the controller may perform a function of each entity of the DU 210.

In the first embodiment, an operation of the base station 200 will be briefly described. The DU 210 may apply a mask symbol pattern to each subframe. The mask symbol pattern will be specifically described in FIG. 3. The DU 210 may determine whether data has been allocated to a subframe to which the mask symbol pattern has been applied. For example, the DU 210 may apply physical downlink shared channel (PDSCH) allocation information per TTI to a subframe, to which the mask symbol pattern is applied, and determine the duration of an empty symbol in each subframe. The empty symbol may refer to a symbol to which a data channel is not allocated in a subframe.

The DU 210 may determine information corresponding to the subframe based on whether the data channel is allocated. The information may correspond to 1 bit information. Further, the information may correspond to 4 bit information. The information may be referred to as pattern information, indication information, an indicator, TTI pattern information, TTI indication information, or the like. For example, when there is no traffic, other than a control channel and an RS, allocated in one subframe, the corresponding TTI pattern information may be indicated as 1. When there is traffic, other than a control channel and an RS, allocated in one subframe, the corresponding TTI pattern information may be indicated as 0. For each case, a pattern information indication method may be differently configured. For example, referring to FIG. 2, information (Pattern 1) may be configured in a subframe 241 and information (Pattern 0) may be configured in a subframe 243. In the case of a subframe 241, symbols 0, 1, 2, and 4 of slot #0 and symbol 4 of slot #1 are allocated an RS, an SS, a control channel, etc. and the remaining symbols are empty symbols. Therefore, the DU 210 may configure the information to be 1 with regard to a subframe 241. Whereas, in the case of a subframe 243, traffic (e.g., PDSCH) other than a control channel is allocated thereto. Therefore, the DU 210 may configure the information to be 0 with regard to a subframe 243.

Further, the DU 210 may determine whether traffic has been allocated to a subframe by comparing the number of empty symbols or the number of symbols to which resources have been allocated with a threshold condition in the subframe. For example, since the number of symbols of a control channel and RS which are allocated for each mask symbol pattern of a subframe is determined, a threshold condition may be determined based on the number of symbols to which the channel and RS corresponding to the mask symbol pattern are allocated.

When information is determined with regard to a subframe, the information may be transferred from the DU 210 to the RU 230. The information may be transferred from the DU 210 to the RU 230 through the CPRI. The RU 230 which has received the information may control dynamic on/off of a PA based on the information. For example, when the information corresponds to 1 in the above-described example, traffic, other than a control channel and an RS, is not allocated to a subframe. In this case, the dynamic PA on/off operation may be performed. The dynamic PA on/off operation refers to turning on/off a PA in units of symbol to which the control channel or the RS is not allocated. For example, a PA is controlled to be in an off state in a symbol to which traffic is not allocated in a data channel area. In the case of a symbol to which the traffic is not transmitted, power consumption may be reduced by turning off the PA. For example, in the case of the subframe 241 in the RU in FIG. 2, a dynamic PA on/off operation is performed. The information on the subframe 241 corresponds to 1, and, in this case, data traffic other than a control channel is not allocated. The RU may turn off the PA at the transmission time point of symbols 3, 5, and 6 of slot #0 and may turn off the PA at the transmission time point of symbols 1, 2, 3, 5, and 6 of slot #1. Meanwhile, when the PA is turned on/off according to each symbol, a delay time for the PA on/off may occur. Therefore, the base station 200 may perform a PA on/off operation in consideration of the delay time. For example, when the duration of consecutive empty symbols is under a predetermined threshold value, a PA on/off operation may not be performed in consideration of the delay time in spite of pattern information.

Conventionally, power consumption has been reduced by lowering a PA bias in a symbol in which PRB usage is low. However, in embodiments of the present disclosure, the power consumption may be reduced by turning off the PA in each symbol for each TTI. Compared with the prior art, the embodiments of the present disclosure may be commonly applied to TDD/FDD systems, have an advantage of greatly reducing power consumption in comparison with a technology for lowering a bias voltage, and reflect an actual traffic change in real time.

The DSP 211 may determine whether to allocate traffic in consideration of RB allocation information at the time of scheduling. The DSP 211 may determine on empty symbol duration of each subframe (or each TTI) in consideration of the RB allocation information. The DSP 211 may transfer information corresponding to each subframe to CPRI FPGA 215. The information may correspond to 1 bit information and may correspond to 0 or 1 according to whether traffic is allocated thereto. The information may be transferred in a TTI period. Further, information corresponding to each of multiple TTIs may also be transferred. The CPRI FPGA 215 may transfer the information to the RU 230. The CPRI FPGA 215 may transfer the information to the RU 230, using a CPRI vendor-specific space (VSS) data. The RU 230 may perform a dynamic PA on/off operation based on the received information. The RU 230 may perform, based on the information, a PA on/off operation with regard to each symbol of each antenna port. Symbol information according to each antenna port corresponding to each mask symbol pattern may be predefined or pre-promised.

FIG. 3 and FIG. 4 are views for describing a method for expressing unused symbol information for each subframe. A symbol to which a control channel or an RS is allocated is indicated by a marking. Referring to FIG. 3, a CRS symbol pattern mask has different symbols, in which a CRS is transmitted, for each antenna port. At antenna ports 0 and 1, the CRS is transmitted in symbols 0 and 4 of slot #0 and slot #1. At antenna ports 2 and 3, the CRS is transmitted in symbol 1 of slot #0 and slot #1.

A control symbol pattern mask may have different areas to which a control channel is allocated according to a control format indicator (CFI). When a CFI value corresponds to 1, a control channel is allocated to symbol 0 of slot #0. When a CFI value corresponds to 2, a control channel is allocated to each of symbols 0 and 1 of slot #0. When a CFI value corresponds to 3, a control channel is allocated to each of symbols 0, 1, and 2 of slot #0. When a CFI value corresponds to 4, a control channel is allocated to each of symbols 0, 1, 2, and 3 of slot #0. In a symbol to which a control channel has been allocated according to the CFI value, the control channel is transmitted at the transmission time point of the symbol.

A primary synchronization signal (PSS) symbol pattern mask is a mask for a symbol to which a primary synchronization signal of a terminal is transmitted. The PSS symbol pattern mask may vary according to an FDD system or a TDD system. In the case of the FDD system, a PSS is transmitted in subframes 0 and 5 subframes among subframes of a radio frame. In the above-described subframes, the PSS is transmitted in symbol 6 of slot #0. In the case of the TDD system, a PSS is transmitted in subframes 1 and 6 among subframes of a radio frame. In the above-described subframes, the PSS is transmitted in symbol 2 of slot #0.

A secondary synchronization signal (SSS) symbol pattern mask is a mask for a symbol to which a secondary synchronization signal of a terminal is transmitted. The SSS symbol pattern mask may vary according to an FDD system or a TDD system. In both the FDD system and the TDD system, an SSS is transmitted in subframes 0 and 5 among subframes of a radio frame. However, in the case of the FDD system, the SSS is transmitted in symbol 5 of slot #0.

A physical broadcast channel (PBCH) symbol pattern mask is transmitted in subframe 0 of a radio frame. In the above-described subframe, a PBCH is transmitted in symbols 0, 1, 2, and 3 of slot #1.

A positioning reference signal (PRS) symbol pattern mask may be allocated according to a PRS transmission period and an offset. Further, a symbol in which a PRS is transmitted may be determined according to the number of transmission antenna ports used by a base station. For example, when the number of antenna ports is 1 or 2, a PRS may be transmitted in symbols 3, 5, and 6 of slot #0 and symbols 1, 2, 3, 5, and 6 of slot #1. When the number of antenna ports is 4, a PRS may be transmitted in symbols 3, 5, and 6 of slot #0 and symbols 2, 3, 5, and 6 of slot #1.

As described above, in each subframe, a symbol transmission location of a control channel or an RS, which is transmitted according to a mask symbol pattern, is predetermined. Therefore, an empty symbol for a dynamic PA on/off may be identified according to the mask symbol pattern and information (indicating whether data traffic has been allocated).

For example, a subframe, to which a CRS and a control channel are allocated, will be described with reference to FIG. 4. FIG. 4 is a subframe to which a CRS and a control channel of CFI=3 have been allocated. In this case, the control channel is allocated to each of symbols 0, 1, and 2 of slot #0 of each subframe. Further, according to an antenna port, in the case of antenna ports 0 and 1, a CRS is allocated to each of symbol 0 and 4 of slot #0 and slot #1. In the case of antenna ports 2 and 3, the CRS is allocated to symbol 1 of slot #0 and slot #1. When data traffic is not allocated to each symbol of FIG. 4 according to the information, a dynamic PA off may be performed in an empty symbol of each subframe. For example, in the subframe of antenna ports 0 and 1, a PA off operation may be performed in symbols 3, 5, and 6 of slot #0 and symbols 0, 1, 2, 3, 5, and 6 of slot #1. The PA off operation may be performed only in some symbols among symbols in which the PA off operation can be performed. When it is indicated that data traffic has been allocated according to the information, a dynamic PA off operation is not performed.

Figure 5A:
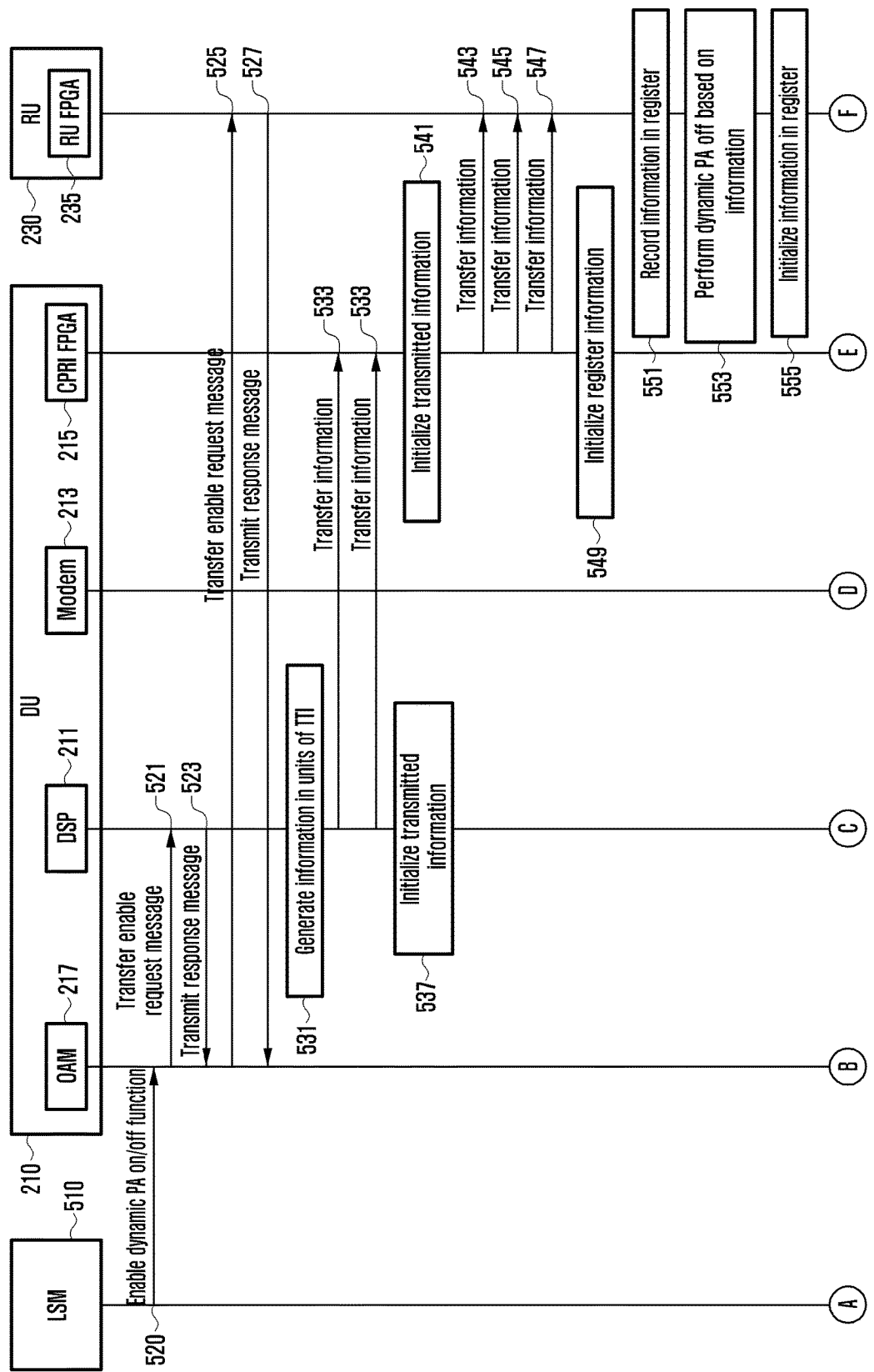
FIG. 5A and FIG. 5B describe an operation method of the first embodiment of the present disclosure.
Figure 5B:
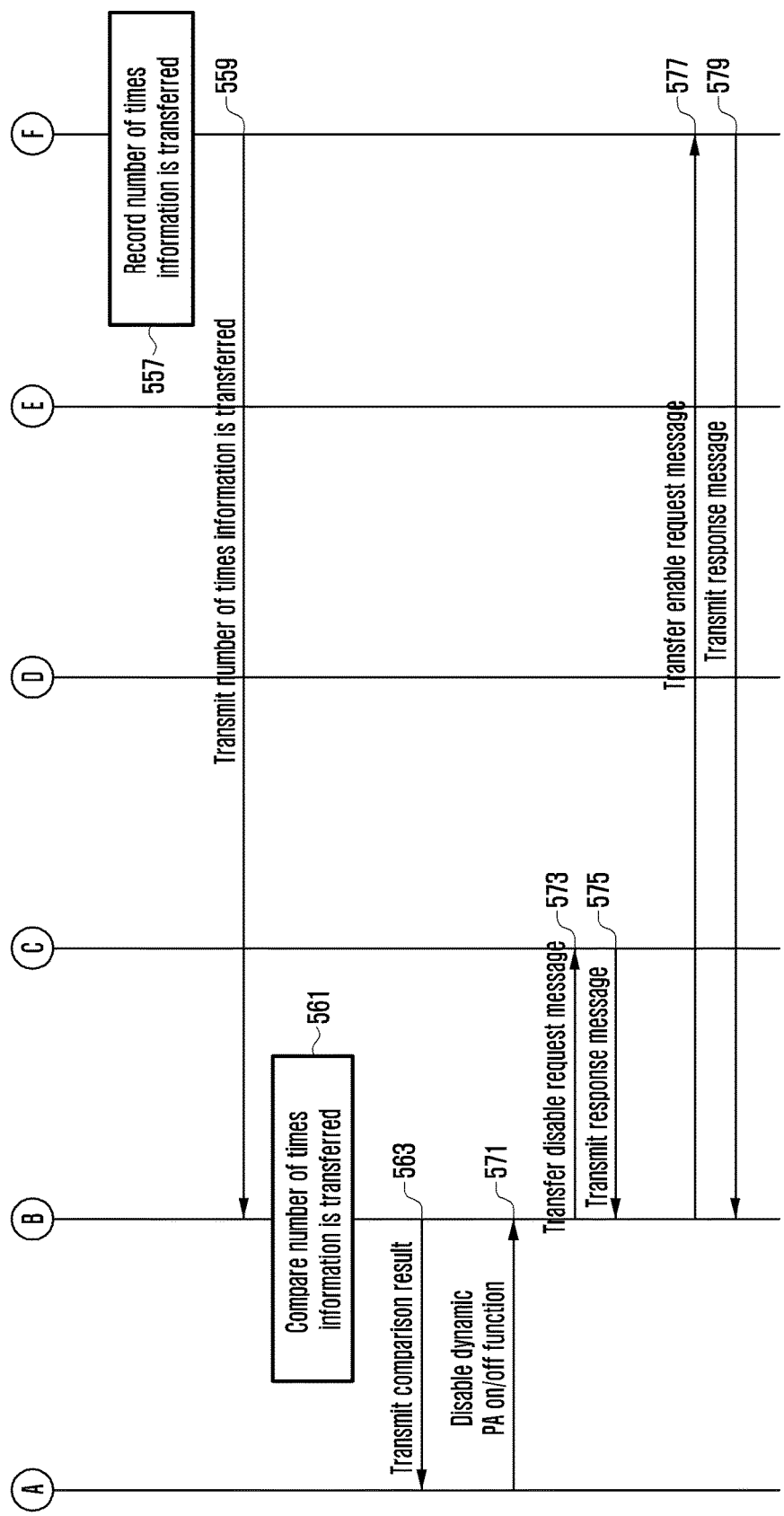

FIG. 5 describes an operation method of the first embodiment of the present disclosure.

Referring to FIG. 5, a system may include an LTE system manager (LSM) 510, the DU 210, and RU 230. The DU 210 and the RU 230 are entities included in a base station. The DU 210 may include the DSP 211, the modem 213, the CPRI FPGA 215, and an OAM 217. Some of entities included in the DU may be omitted and at least two entities may constitute one entity. The RU 230 may include an RU FPGA 235. Each entity operation described below may be controlled by a controller that controls overall operations of the DU 210.

In step 520, an LSM 510 may transmit a dynamic PA on/off enable request message to the DU 210. The OAM 217 of the DU 210 may receive the message. When receiving the PA on/off enable request message, the DU may be configured to perform a dynamic PA on/off operation. Meanwhile, the DU may perform the dynamic PA on/off operation according to the self-configuration of a base station without receiving the message from the LSM 510. The received enable request message may be transmitted to the DSP 211 in step 521, and the DSP 211 may transmit a response message to the OAM 217 in step 523. The received enable request message may be transmitted to the RU 230 in step 525 and the RU 230 may transmit a response message to the OAM 217 in step 527.

The DU 210 may configure a dynamic PA on/off operation. The DU 210 may generate information in units of a TTI or a subframe according to RB allocation information based on the dynamic PA on/off operation configuration in step 531. The information may correspond to pattern information. The information may be generated by the DSP 211. The DSP 211 may transfer the generated information to the CPRI FPGA 215 in step 533 and step 535. The information may be transferred in a period of about 1 ms. For example, a unit of TTI or subframe may be 1 ms. When the pattern information is transferred, 4 bits may be transmitted to each cell. For example, Pattern 1 may include 0001 and Pattern 0 may include 0000. It is preferable that information transfer is completed before 210 μs based on synchronization of 15 hyper frames configuring DU FPGA 1 ms. The DSP 211 may transmit information and then initialize the transmitted pattern information in step 537.

The DU 210 may transfer the information to the RU 230. For example, the CPRI FPGA 215 of the DU 210 may identify information received from the DSP 211. The information may be identified in a period of about 1 ms. The CPRI FPGA 215 may include the information to a field of a message transferred to the RU. For example, the CPRI FPGA 215 may include pattern information in a VSS field of a CPRI hyper frame containing data of a first LTE slot in step 541.

The CPRI FPGA 215 may transfer the information to the RU 230 in step 543, step 545, and step 547. The CPRI FPGA 215 may transfer the information to a Field Programmable Gate Array (FPGA) 235 of the RU 230 through the VSS. The information may be transferred 3 times in a 1 ms period in units of a hyper frames. The CPRI FPGA 215 may transfer the information and then initialize the information into 0000 in a register.

The RU 230 may record the information based on the information in step 551. For example, the RU FPGA 235 may identify a VSS of a CPRI hyper frame of 1 ms period, which includes information, and record the information in a register.

The RU 230 may perform a dynamic PA on/off operation to be suitable for the information in step 553. The RU FPGA 235 may control a dynamic PA on/off operation based on the information. In the case of a PA on/off, a PA off operation may be performed in an empty symbol. At this time, the empty symbol may be determined based on a mask symbol pattern of the corresponding subframe. An empty symbol identification/determination method based on the mask symbol pattern refers to FIG. 3 and FIG. 4.

The RU 230 may initialize the information in the register after performing the PA on/off in step 555. The RU FPGA 235 may initialize the information in the register after performing the PA on/off.

The DU 210 or the RU 230 may record how many times information, which indicates the performance of a dynamic PA off operation, has been transferred. For example, the RU FPGA 235 may record how many times RU FPGA 235 has received, from the CPRI FPGA, information which indicates the performance of a dynamic PA off operation in step 557 and may transfer the number of times to the OAM 217 in step 559.

The OAM 217 may compare the number of times by which the OAM 217 has transferred information, which indicates the performance of a dynamic PA off operation, received from each of the DSP 211 and the number of times by which the OAM 217 has transferred information, which indicates the performance of a dynamic PA off operation, received from each of the RU 230 in step 561. The OAM 217 may transfer the comparison result to the LSM 510 in step 563.

When a dynamic PA on/off function is disabled by an operator, a disable request message may be transferred to DU 210 in step 571. The OAM 217 may transfer the disable request message to the DSP 211 in step 573 and the DSP 211 may transmit a response message to the OAM 217 in step 575. The OAM 217 may transfer the disable request message to the RU 230 in step 577 and the RU 230 may transmit a response message to the OAM 217 in step 579.

Meanwhile, the embodiments of FIG. 5 describe a case in which the DU 210 and the RU 230 are separated from each other in a base station. However, the embodiments of FIG. 5 may obviously be applied to a case in which the DU 210 and the RU 230 are not separated from each other in the base station. In this case, a part of signal transfer steps of the DU 210 and the RU 230 may be omitted.

Figure 6:
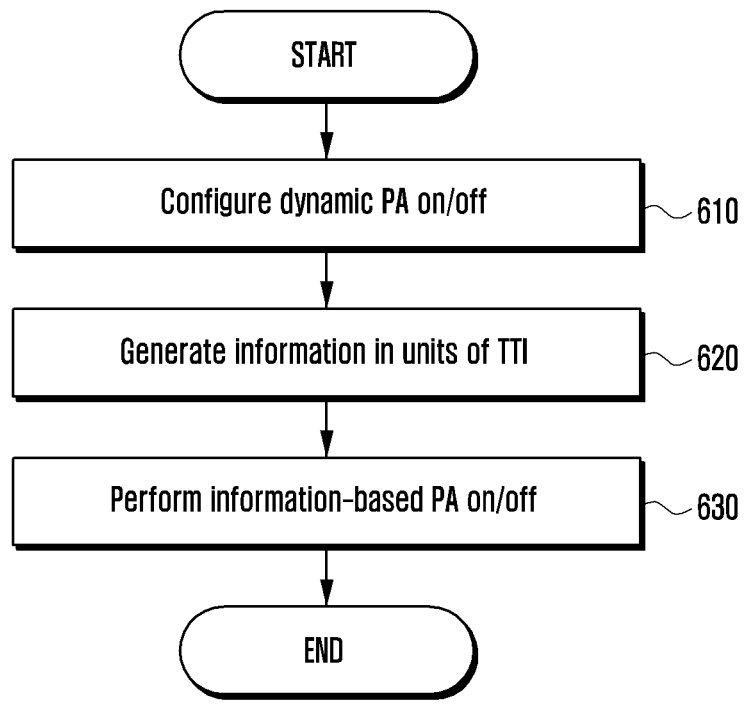
FIG. 6 describes an operation of a base station according to the first embodiment of the present disclosure.

FIG. 6 describes an operation of a base station according to the first embodiment of the present disclosure. Referring to FIG. 6, in step 610, the base station may configure a dynamic PA on/off function. The configuration may include enabling the function. The dynamic PA on/off may be configured by the base station and may also be configured based on an enable request message transmitted by the LSM.

In step 620, the base station may generate information in units of TTI according to RB allocation information. The information may indicate whether data traffic, other than a control channel and an RS, has been allocated to a corresponding subframe. When the base station has an RU and a DU which are separated from each other therein, the DU may generate information and the generated information may be transferred to the RU. When the base station has an RU and a DU which are not separated from each other therein, the generated information may be immediately used. A method for transferring the information generated by the DU to the RU refers to the method described in FIG. 5.

In step 630, the base station may perform a PA on/off operation based on the information. The base station may also perform the PA on/off operation according to the information after recording the information in a register. When the information indicates that data traffic has not been allocated to the corresponding subframe, the PA off operation may be performed in an empty symbol of the corresponding subframe. In other words, the base station may perform a PA off operation at the transmission time point of the empty symbol of the corresponding subframe. The empty symbol of the corresponding subframe may be identified by applying a mask symbol pattern. The empty symbol identification based on the mask symbol pattern is performed with reference to the description of FIG. 3 and FIG. 4. Since the information is applied for each subframe, the base station may also perform a PA off operation, based on the information, with regard to another subframe.

Meanwhile, it is obvious that the operation of the base station described in FIG. 5 may be additionally performed.

Next, the second embodiment will be described. Unlike a PA on/off scheme (the first embodiment) based on DU-RU unused symbol duration information, in the second embodiment, the RU analyzes, in advance, baseband IQ data in real time in the RU. When a value corresponding to 0 is provided for a determined time, a PA gate bias is turned off. When a value other than 0 is provided, the PA gate bias is turned on. A PA on/off control must not affect RF output power, and thus must be performed in advance in consideration of the transient time of the PA gate bias and the uncertainty for performing a PA gate bias on/off control command.

Figure 7:
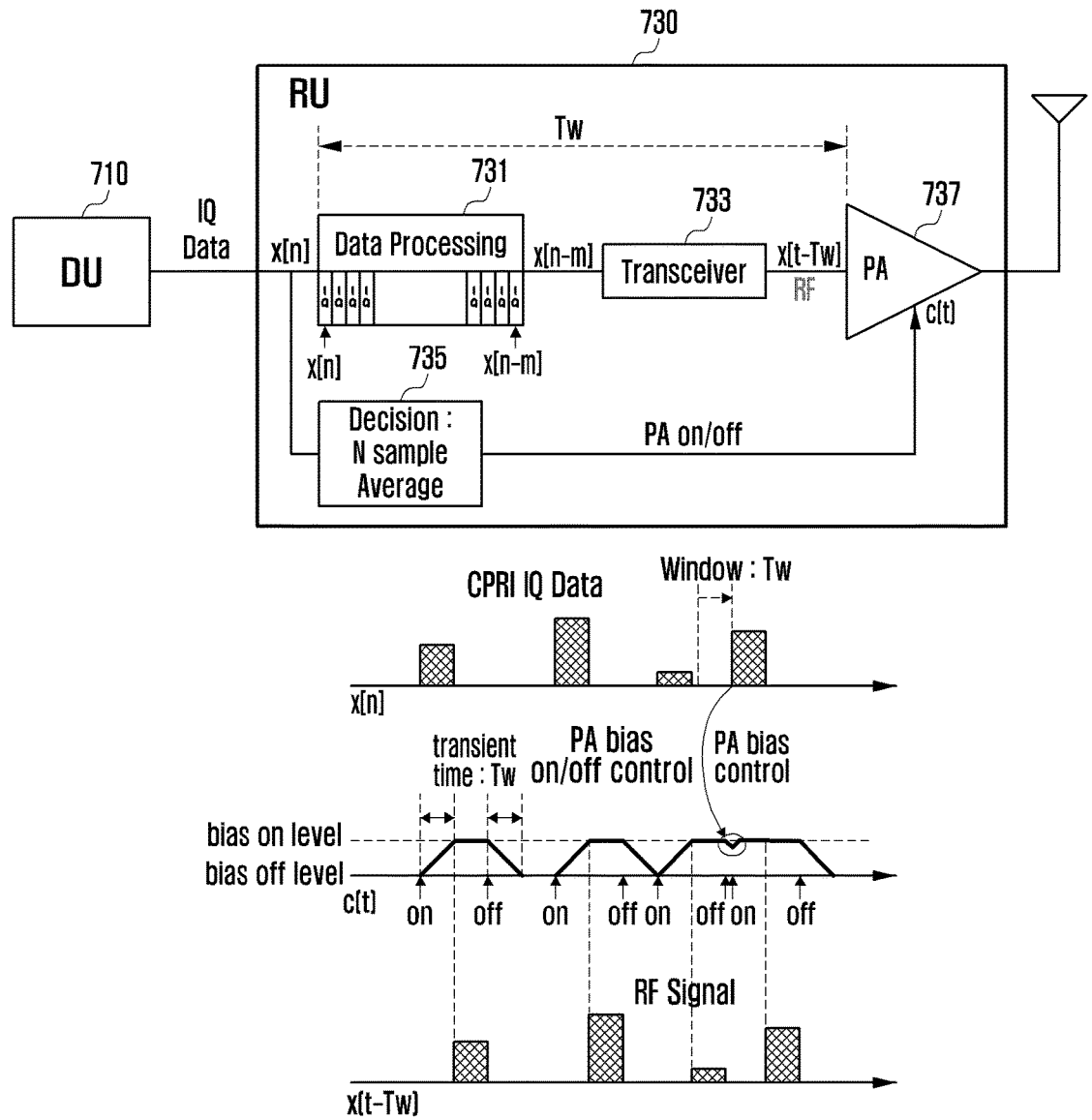
FIG. 7 describes a signal processing step according to the second embodiment of the present disclosure.

FIG. 7 describes a signal processing process according to the second embodiment of the present disclosure. Referring to FIG. 7, a DU 710 may transmit, to an RU 730, data to be transmitted by a wireless resource. At this time, the data may be in-phase/quadrature-phase (IQ) data. When there is no data to be transmitted by the DU 710, the IQ data is zero. The RU 730 detects the IQ data for a predetermined duration. During the preset duration (e.g., a particular threshold value may be applied), when the IQ data is considered absent, a power amplifier (PA) 737 of the RU 730 may be turned off. When the data does not exist, data to be transmitted is absent. Therefore, the PA may be turned off based on a time at which the IQ data is determined to be absent and transmission time point. When the IQ data is 0, the IQ data may be identified or considered absent. In other words, when a baseband IQ DATA is, in advance, analyzed in real time and a value corresponding to 0 is provided for a determined time through the analysis, the PA 373 may be turned off at the corresponding time and transmission time point. A PA off includes turning off the PA gate bias. When a value other than 0 is provided, the PA gate bias may be turned on. A PA on includes turning on the PA gate bias. Meanwhile, a threshold value of the duration, during which the IQ data is 0, or the length of the preset duration may be determined in consideration of a transient time value described below. For example, the threshold value or the length of the preset duration may be larger than a transient time value.

Meanwhile, a transient time substantially exists in a PA on/off. In other words, as soon as the PA is turned on, a bias on level cannot be reached. At this time, a time from a bias off to the bias on level is referred to as a transient time. The bias on level may be a bias level required to transmit an RF by the PA. The transient time may be about 5 μs.

In FIG. 7, the x[n] is a timing series before the IQ data is input in a data processing unit 731, c(t) is a timing function at which the PA bias is turned on/off, and x(t−Tw) is a timing function before an RF signal is input in the PA. In order for the PA to be transmitted, the PA bias on level must be reached according to a PA on operation at a time identical to or prior to a time at which the RF signal is input in the PA. In other words, power consumption may be reduced by turning on an amp at a time point at which traffic to be transmitted reaches the PA and turning off the amp when the PA reaches the time at which traffic to be transmitted does not exist. An amp off may use a gate bias.

The detailed configuration of the RU 730 will be described. The data processing unit 731 may adjust IQ data processing and data transmission time. A transceiver 733 may change an IQ signal to an RF signal. A decision 735 may monitor N IQ samples and determine a PA on/off. The PA on/off and a PA on/off time point may be determined. When the PA on/off time point is determined, a transient time may be considered. The PA 737 is a power amplifier. However, the detailed configuration of the RU 730 is not limited thereto and at least two entities among the above-described entities may be configured to become one entity. For example, an operation of each unit may be performed or controlled by the controller that controls overall operations of the RU 730.

In other words, when IQ data samples have a value of 0 during a Tw time, the base station may determines the PA bias to be in an off state and turn off the PA by lowering a PA gate bias voltage. In other words, when one or more samples among the IQ data samples has a value other than 0 during the Tw time, the base station may determine the PA gate bias voltage to be in an on state and turn on the PA by increasing the PA gate voltage.

Figure 8:
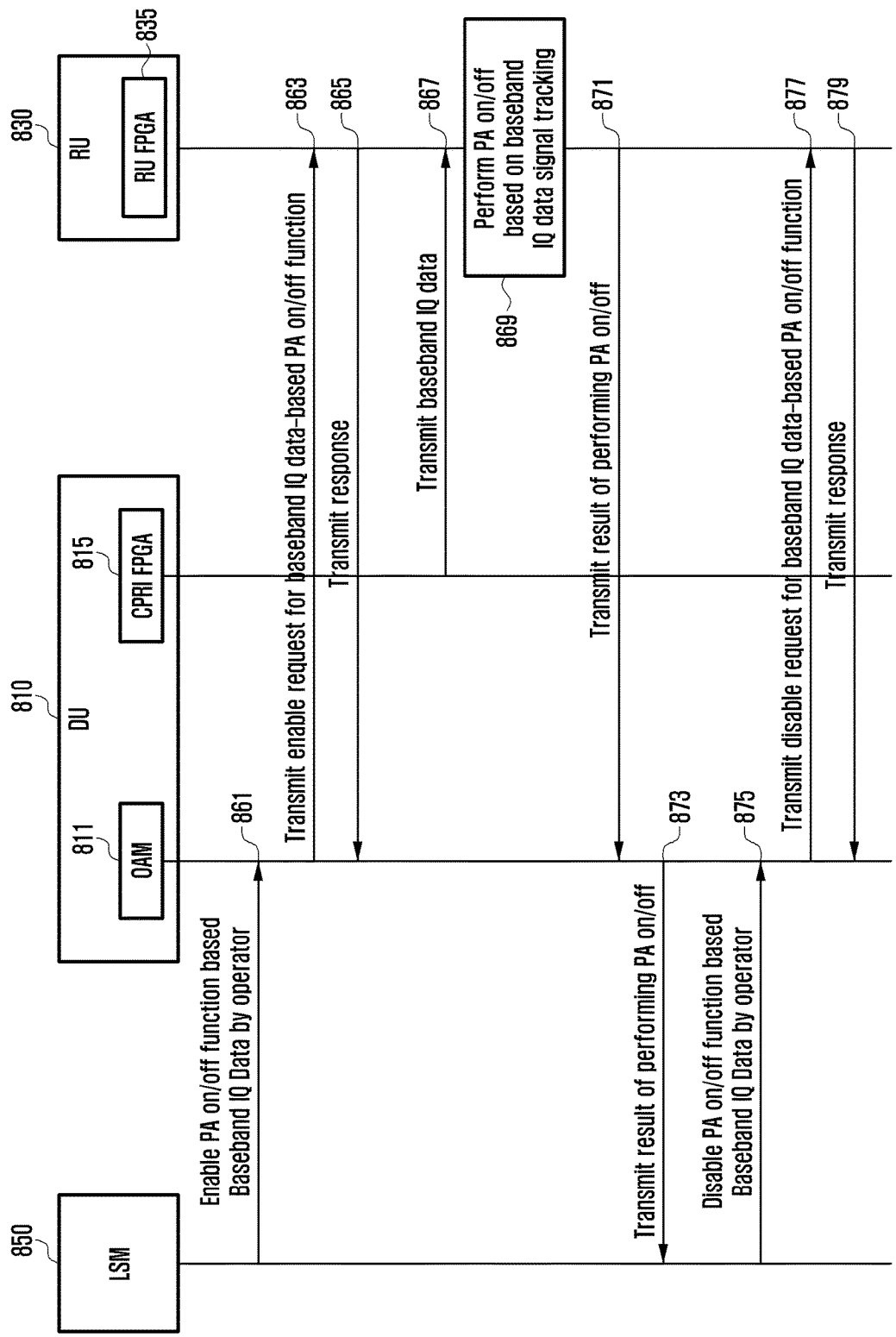
FIG. 8 describes an operation method of the second embodiment of the present disclosure.

FIG. 8 describes an operation method of the second embodiment of the present disclosure.

Referring to FIG. 8, a system may include an LSM 850 and a base station. The base station may include a DU 810 and an RU 830. FIG. 8 describes a base station in which the DU 810 and the RU 830 are separated from each other. However, a base station, in which the DU 810 and the RU 830 are not separated from each other, operates similarly.

In step 861, a PA on/off function based on a baseband IQ data may be enabled by an operator. The LSM 850 may transmit an enable request message to the DU 810. Meanwhile, the PA on/off function based on the IQ data may be configured by the base station itself.

The DU 810 may transmit the enable request message of the PA on/off function based on the baseband IQ data to the RU 830 in step 863 and the RU 830 may transmit a response message to the DU in step 865. The enable request message may be transmitted from a DU FPGA 815 to an RU FPGA 835 and the response message may be transmitted from the RU FPGA 835 to the DU FPGA 815.

In step 867, the DU 810 transmits the baseband IQ data to the RU 830. In step 869, the RU 830 may perform a PA on/off function based on baseband IQ data signal tracking. In relation to a specific operation method, the method described in FIG. 7 will be referred to.

In step 871, the RU 830 transfers, to the DU 810, a result obtained from performing a PA on/off. The result obtained from performing a PA on/off may be transmitted to the OAM 811 of the DU 810. In step 873, the DU 810 may transmit, to the LSM 850, the received result obtained from performing a PA on/off. Meanwhile, the step of transmitting the result obtained by performing a PA on/off may be omitted.

The PA on/off function based on baseband IQ data may be disabled according to the operator's configuration. The LSM 850 may transmit a disable request message to the DU 810 in step 875. In addition to the disable request message from the LSM 850, the base station itself may disable the PA on/off function.

The DU 810 may transmit the disable request message of the PA on/off function based on the baseband IQ data to the RU 830 in step 877 and the RU 830 may transmit a response message to the DU 810.

Figure 9:
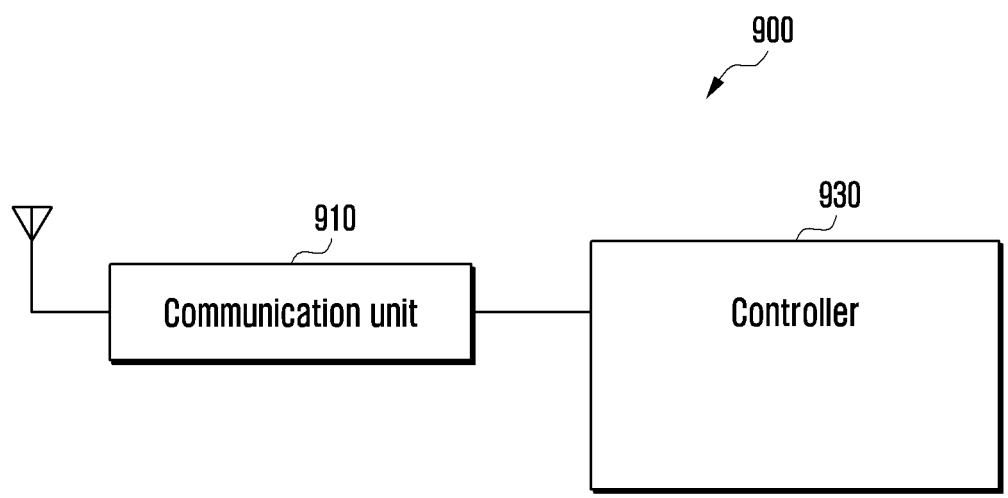
FIG. 9 illustrates a base station according to an embodiment of the present disclosure.

FIG. 9 illustrates a base station according to an embodiment of the present disclosure. A base station 900 may include: a communication unit that communicates with at least one network node; and a controller 930 that controls overall operations of the base station. The base station 900 may include a DU and an RU. According to an embodiment of the present disclosure, the controller 930 may control the base station to perform a power consumption reducing method using the first and second embodiments of the present disclosure, described through FIG. 1 to FIG. 8.

According to an embodiment of the present disclosure, the controller 930 may determine the duration of an empty symbol in at least one subframe and control the PA on/off operation based on the determination result. At this time, the empty symbol may be a subframe to which a control channel or data traffic has not been allocated in the subframes. The subframe may be identical to a TTI.

Further, the controller 930 may perform a control so that information, which corresponds to the determination, is generated. At this time, the information may correspond to one of first information relating to a subframe to which data traffic is not allocated and second information relating to a subframe to which data traffic is allocated. The information may be bit information, bit map information, and the like.

Further, the controller 930 may perform a control so that the empty symbol is identified based on allocation information of a mask symbol pattern and physical downlink shared channel (PDSCH) of the subframe.

Further, when the information of the subframe is the first information, the controller 930 may perform a control so that a PA off operation is performed in the empty symbol. When the information of the subframe is the second information, the controller 930 may perform a control so that the PA off operation is not performed.

Further, the controller 930 may generate baseband IQ data, determine whether data to be transmitted included in the baseband IQ data for the preset time, and perform a control so that the PA on/off operation is performed based on the determination result and the transient time of the power amplifier. At this time, the preset time may be longer than the transient time and the transient time is a time at which the bias voltage level of the PA is converted from a bias off level to a bias on level.

Further, the controller 930 may confirm a PA off duration when a value of the baseband IQ data is 0 for the predetermined time. The controller 930 may determine the value to be a PA on duration when the baseband IQ data has at least one non-zero value for the predetermined time. Further, when the PA is turned on, the controller 930 may perform a control so that the PA on operation is performed in consideration of the transient time before the baseband IQ data is input to the PA.

The embodiments disclosed in the present specifications and drawings are provided merely to readily describe and to help a thorough understanding of the present disclosure but are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

What is claimed is:

1. A method for controlling power consumption by a base station, the method comprising:
    selecting at least one duration of a plurality of durations in a subframe based on bitmap information indicating whether data is allocated to each of the plurality of durations in the subframe, each of the plurality of durations comprising at least one symbol;
    performing a power amplifier (PA) off operation for the at least one duration based on the bitmap information when a length of the at least one duration is greater than a threshold,
    wherein the at least one duration comprises at least one empty symbol to which the data is not allocated, and
    wherein the threshold is determined based on a transient time according to an on/off operation of the PA.

2. The method of claim 1, wherein the at least one duration is not allocated a control channel and a reference signal in the subframe.

3. The method of claim 1, wherein the bitmap information includes first information relating to a duration to which data is not allocated and second information relating to a duration to which the data is allocated.

4. The method of claim 3, wherein, the PA off operation is performed in the at least one duration when the bitmap information is the first information, and the PA off operation is not performed when the bitmap information is the second information.

5. The method of claim 3, wherein: the bitmap information is generated by a data unit of the base station, and
    the PA off operation is performed by a radio frequency unit.

6. The method of claim 1, wherein:
    the plurality of durations in the subframe are determined based on allocation information associated with a control channel and a reference signal, and
    the allocation information includes mask symbol pattern information.

7. A base station for adjusting power consumption, the base station comprising:
    a power amplifier (PA) that amplifies a wireless signal; and
    a controller that selects at least one duration of a plurality of durations in a subframe based on bitmap information indicating whether data is allocated to each of the plurality of durations in the subframe, each of the plurality of durations comprising at least one symbol and controls a PA off operation for the at least one duration based on the bitmap information when a length of the at least one duration is greater than a threshold,
    wherein the at least one duration comprises at least one empty symbol to which the data is not allocated, and
    wherein the threshold is determined based on a transient time according to an on/off operation of the PA.

8. The base station of claim 7, wherein the at least one duration is not allocated a control channel and a reference signal in the subframe.

9. The base station of claim 7, wherein the bitmap information includes first information relating to a duration to which data is not allocated and second information relating to a duration to which data is allocated.

10. The base station of claim 9, wherein the PA off operation is performed when the bitmap information of the subframe is the first information and the PA off operation is not performed when the bitmap information is the second information.

11. The base station of claim 9, wherein the controller is included in a data unit, and the PA is included in a radio frequency unit that performs the PA off operation.

12. The base station of claim 7, wherein:
    the controller determines the plurality of durations in the subframe based on allocation information associated with a control channel and a reference signal, and the allocation information includes mask symbol pattern information.

13. A method for controlling power consumption by a base station, the method comprising:
  generating baseband in-phase/quadrature-phase (IQ) data;
  determining whether data to be transmitted for a predetermined time is included in the baseband IQ data; and
  controlling a power amplifier (PA) on/off based on the determination result and a transient time for changing from a bias off level to a bias on level of the PA,
  wherein, when the PA is turned on, a PA on operation is performed at a second time that precedes, by the transient time, a first time when the baseband IQ data is input in the PA.

14. The method of claim 13, wherein, in the determining,
  a PA off period is determined when a value of the baseband IQ data is 0 for the predetermined time and
  a PA on period is determined when a value of the baseband IQ data has at least one non-zero value for the predetermined time.

15. The method of claim 13, wherein the predetermined time is longer than the transient time.

16. A base station for controlling power consumption, the base station comprising:
  a power amplifier (PA) that amplifies a wireless signal; and
  a controller that generates a baseband in-phase/quadrature-phase (IQ) data, determines whether data to be transmitted for a predetermined time is included in the baseband IQ data, and performs a control such that a PA on/off is performed based on the determination result and a transient time for changing from a bias off level to a bias on level of the PA,
  wherein, the controller performs a control such that when the PA is turned on, a PA on operation is performed at a second time that precedes, by the transient time, a first time when the baseband IQ data is input in the PA.

17. The base station of claim 16, wherein, the controller determines a PA off period when a value of the baseband IQ data is 0 for the predetermined time and determines a PA on period when a value of the baseband IQ data has at least one non-zero value for the predetermined time.

18. The base station of claim 16, wherein the predetermined time is longer than the transient time.

* * * * *